May 13, 1952  J. E. KISER  2,596,901
BUBBLE BATH MIXER
Filed Feb. 20, 1948
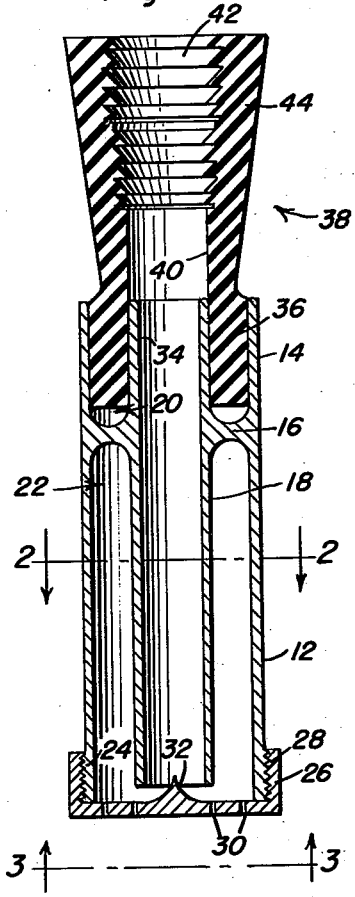
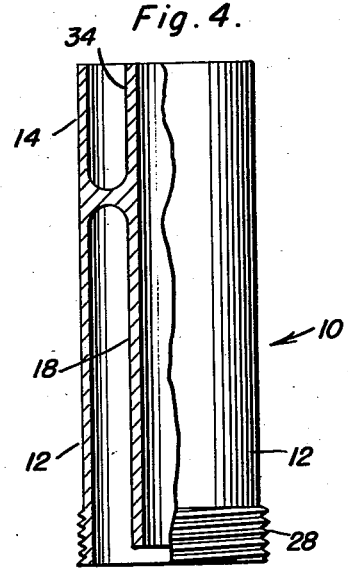
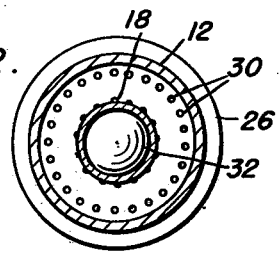
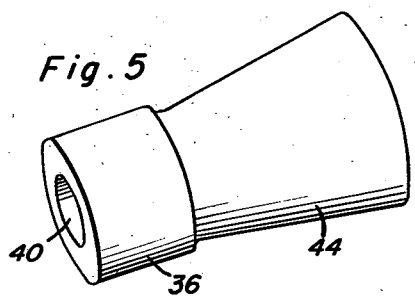
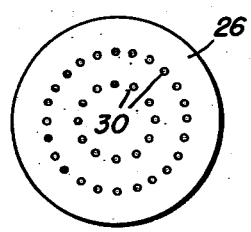
John Edwin Kiser
INVENTOR.
BY Patented May 13, 1952

2,596,901

UNITED STATES PATENT OFFICE 2,596,901

BUBBLE BATH MIXER

John Edwin Kiser, Sidney, Ohio

Application February 20, 1948, Serial No. 9,909

2 Claims. (Cl. 299—83)

This invention relates generally to mixing devices, and more particularly to a bubble bath mixer and an adaptor whereby the mixer may be removably secured to a hot water faucet.

A primary object of this invention is to provide a mixer which, while being small in size, has an appreciable capacity for containing the material with which the water is to be burdened, and will allow rapid mixing of a large quantity of water without replenishment.

Another object of this invention is to provide a mixer in which the closure for the mixing compartment comprises a screen outlet for the burdened water, and in which this closure is formed with a deflector which directs the water over the apertures in the closure so as to prevent clogging thereof.

Another object of this invention, ancillary to the preceding object, is to arrange the inlet tube of the mixer, with the mixing compartment and the said closure therefor in such a manner that maximum agitation of the water occurs immediately within the apertured portion of the closure, thus assuring maximum efficiency in operation, while efficiently preventing the clogging of the apertures in the closure.

Still another object of this invention is to provide an improved adaptor and mounting for this adaptor on the mixer proper.

And a last object to be mentioned specifically is to provide a bubble bath mixer of improved structural design, allowing the greatest simplicity in the construction and operation thereof, and which will give generally efficient and durable service.

With these objects definitely in view, this invention resides in certain novel features of construction, combination and arrangement of elements and portions which will be described in the specification, particularly pointed out in the appended claims, and illustrated in the accompanying drawings which forms an important part of this disclosure, and in which:

Figure 1 is a central longitudinal sectional view of the mixer and adaptor;

Figure 2 is a transverse sectional view, taken on a plane through the line 2—2 in Figure 1;

Figure 3 is a lower end elevational view of the screw cap comprising the closure for the mixing compartment;

Figure 4 is a side elevational view of the casing with the adaptor and the screw cap closure removed, a portion of the casing being broken away to illustrate the internal structure thereof; and Figure 5 is a three-dimensional view of the adaptor.

Similar characters of reference designate similar or identical elements and portions throughout the specification and throughout the several views in the drawing.

Referring now to the drawing in detail, the environment wherewith this invention is adapted to be used will ordinarily include a bath tub having a hot water faucet, neither bath tub nor faucet being represented in the drawings, and it will be understood that the hot water is to be burdened with saponified material, usually of crystalline or flaky form.

It is proposed by this invention to provide a casing, generally indicated by the numeral 10, which will ordinarily be cylindrical and which will have lower wall portions 12, upper wall portions 14, a transversely disposed dividing wall 16, and an inlet tube 18 arranged coaxially of the casing 10. It will be clear from an inspection of the figures that the elements numbered 12—18 may all be integral, and it will also be noted that the transverse wall 16 is disposed near to the upper end of the casing 10, the relative terms "upper" and "lower" in this specification relating to a mixer when held in operative position, that is, when mounted upon a hot water faucet in which the actual outlet tube depends into a bath tub.

Since the tube 18 is substantially coextensive in length with the casing 10, it follows that a recess 20 of annular form is provided in the upper end of the device and a mixing chamber 22 is provided in the lower portion of the device, the mixing chamber being longer than the recess 20 but of similar annular form. The lower end of the tube 18 is shortened slightly so that the lower end 24 of the wall portion 12 extends beyond the lower end of the tube and the mixing chamber 22 is provided with a closure in the form of a screw cap 26 engageable externally on the said lower end 24 which is threaded as indicated at 28. The screw cap 26 has a plurality of apertures 30 and a centrally disposed conoidal deflector 32 which may be integral with the central portion of the cap and which extends within the lower end of the tube 18 when the screw cap is screwed onto the end of the casing 10.

The upper end 34 of the tube 18 and the upper wall portions 14 are cemented to the lower end portion 36 of an adaptor generally indicated by the numeral 38. This lower end portion 36 is, of course, of hollow cylindrical form and the adaptor is constructed of resilient material such as rubber with the channel 40 extending longitudinally therethrough and formed with a stepped and notched portion 42 to facilitate the insertion of the adaptor on a hot water faucet. It is preferred that the upper portion of the adaptor shall be of tapered form, as indicated at 44, and the lower portion 36 may be of regular cross section.

It will be clear that the specific construction of the adaptor 38 and the upper end of the casing 10 is such that a very strong connection may easily be obtained between the adaptor and the mixer proper, and it will also be clear that the various elements in this invention are designed with an extreme simplicity, while providing for efficient operation.

The operation of this invention will be clearly understood from the foregoing description of the mechanical details thereof, taken in connection with the above recitation of the objects sought to be achieved by this invention. In recapitulation, it may be further stressed that the configuration and arrangement of the screw cap 26 with its conoidal deflector 32, in relation to the lower end of the tube 18 and the mixing chamber, assure that the maximum agitation of the water, with the material to be added thereto, occurs immediately within the apertured portion of the screw cap 26. In this way, the apertures 30 are prevented from becoming clogged while the water passing through these apertures emerges directly from an area of intense agitation and consequent perfect mixing with the said material. The relatively large mixing chamber 22 provides for a relatively large capacity storage space for such material so that the device need not be loaded prior to each successive use of the equipment. It will also now be clear that the actual loading of the material into the casing is a simple matter, being accomplished by the removal of the screw cap 26, and in this connection it may be noted that no harm will come on insertion of some of the material into the lower end of the tube 18, since immediately upon the entrance of water into the upper end of this tube, the material therein is forced downwardly and outwardly into the mixing chamber 22.

Minor variation in the exact details of construction and proportionment of the various elements of this invention may be resorted to without departure from the spirit and scope thereof, and the scope of this invention should be limited only in accordance with a proper interpretation of the terminology used in the subjoined claims.

Having described the invention, what is claimed as new is:

1. A bubble bath mixer for use with a water faucet, comprising an elongated casing, a tube rigidly secured longitudinally of and within said casing, one end of said tube communicating with said faucet, a mixing chamber within said casing and communicating with the other end of said tube, a removable closure for said mixing chamber, said closure including a plate having apertures comprising an outlet for burdened water, said plate being disposed adjacent said other end of the tube, said closure having an inwardly pointed deflector positioned coaxially with said tube and integral with the inside surface of the closure and directing water from said other end to move substantially parallel said plate.

2. A bubble bath mixer for use with a water faucet, comprising an elongated casing, a tube rigidly secured longitudinally of and within said casing, one end of said tube communicating with said faucet, a mixing chamber within said casing and communicating with the other end of said tube, a removable apertured closure for said mixing chamber, said tube and casing being coaxial, said closure being a screw cap having an apertured plate portion, and said plate portion having a cone shaped end dimensioned and positioned coaxially of the tube and on the inside surface of the cap to comprise a deflector for water flowing from said other end of the tube into said mixing chamber, whereby the water is directed to move substantially parallel to said plate portion and the apertures in said cap are prevented from becoming clogged.

JOHN EDWIN KISER.

REFERENCES CITED

The following references are of record in the file of this patent:

UNITED STATES PATENTS

| Number | Name | Date |
| --- | --- | --- |
| 316,581 | Stratton | Apr. 28, 1885 |
| 1,242,905 | Atkinson | Oct. 16, 1917 |
| 1,517,926 | Weckesser | Dec. 2, 1924 |
| 1,745,323 | Coe et al. | Jan. 28, 1930 |
| 2,304,867 | Wenker | Dec. 15, 1942 |